United States Patent [19]
Whitehead

[11] Patent Number: 5,127,663
[45] Date of Patent: Jul. 7, 1992

[54] TANDEM TRAILER TRUCK FOR TRANSPORTING ELONGATE OBJECTS

[76] Inventor: Jerald M. Whitehead, HC 33 Box 1070, Boise, Id. 83705

[21] Appl. No.: 638,218

[22] Filed: Jan. 7, 1991

[51] Int. Cl.⁵ .......................... B60P 3/40; B62D 53/00
[52] U.S. Cl. .................................. 280/404; 280/81.1; 280/81.6
[58] Field of Search ...................... 280/81.1, 81.6, 404, 280/408

[56] References Cited

U.S. PATENT DOCUMENTS

| | | | |
|---|---|---|---|
| 1,450,759 | 4/1923 | Snyder | 280/486 |
| 2,112,201 | 3/1938 | Larison | 280/401 |
| 3,066,953 | 12/1962 | Chosy | 280/81.1 |
| 3,087,744 | 4/1963 | Tanenbaum | 280/404 |
| 3,374,010 | 3/1968 | Crockett et al. | 280/81.1 |
| 3,591,200 | 7/1971 | Van Raden | 280/404 |
| 3,972,540 | 8/1976 | Donaldson | 280/404 |
| 4,017,094 | 4/1977 | Pilcher | 280/404 |
| 4,226,436 | 10/1980 | Donaldson | 280/404 |
| 4,660,848 | 4/1987 | DeWitt | 280/404 |
| 4,665,834 | 5/1987 | van Iperen | 280/404 |
| 4,966,383 | 10/1990 | Sjostrom | 280/404 |

FOREIGN PATENT DOCUMENTS 9002681  3/1990  World Int. Prop. O. .......... 280/404

*Primary Examiner*—Mitchell J. Hill
*Attorney, Agent, or Firm*—Christensen, O'Connor, Johnson & Kindness

[57] ABSTRACT

A truck-trailer-trailer combination including an intermediate trailer that has two load carrying bunk assemblies. The intermediate trailer carries the rearward end of a first set of elongate objects and the forward end of a second set of elongate objects. The forward end of the first set of elongate objects is carried by the truck and the rearward end of the second set of elongate objects is carried by a rear trailer. The truck-trailer-trailer combination carries such loads in a manner that complies with existing highway regulations and allows the user to reduce the number of trips required in order to transport a given number of elongate objects.

14 Claims, 3 Drawing Sheets

TANDEM TRAILER TRUCK FOR TRANSPORTING ELONGATE OBJECTS

FIELD OF THE INVENTION

The present invention relates to improvements in long load carrying truck-trailer combinations that are typically used to transport elongate objects such as steel beams, logs, and the like.

BACKGROUND OF THE INVENTION

Transportation of logs from their place of cutting to mills where they are processed into intermediate and final products is done primarily with logging trucks. In many areas of the country, during logging season, logging trucks run on narrow two-lane highways. The frequent encounters between logging trucks and other vehicles provide ample opportunity for accidents, particularly harmful accidents.

The loads carried by these trucks are often limited by regulatory agencies on order to reduce the wear and tear on highways. Often, these regulations are set forth in terms of the loaded weight per tire of the logging truck. While this type of regulation is certainly desirable from the standpoint of maintaining our nation's highways and reducing maintenance costs, it is a barrier to the logging industry's need to transport as large a load as possible in order to minimize the number of trips and reduce fuel and maintenance costs. The number of trips required to transport a given number of logs is a factor that contributes to the overall cost of converting raw timber into intermediate and finished products.

It is desirable to make available to the logging industry as well as other industries that often transport elongate elements a vehicle capable of carrying increased loads within the regulatory weight-per-tire limitations established by the highway agencies. By increasing the payload of logging trucks, fewer trips would be required to transport a given number of logs, which would mean fewer encounters with passenger cars, thus reducing the likelihood of harmful accidents. Also, fewer trips would mean less wear and tear on the nation's highways as well as reduced fuel and maintenance costs for the logging companies, savings that could be passed onto the general public.

In addition to satisfying the regulatory agency's requirements and carrying increased loads, it is desirable to provide such a vehicle that has handling and turning characteristics that are comparable to, if not better than, existing trucks for carrying elongate elements such as logs. It would also be desirable to provide such a vehicle that could be retrofitted or used with existing truck-trailer combinations. Such a vehicle would have application in the logging industry as well as application in other industries that require the transportation of elongate objects.

SUMMARY OF THE INVENTION

The present invention relates to a truck-trailer-trailer combination for hauling two sets of longitudinally spaced elongate objects, such as logs. The truck-trailer-trailer combination can carry increased payloads while still complying with existing weight and length regulations in most states of the northwestern United States and western Canadian provinces. The truck-trailer-trailer combination reduces wear and tear on highways by decreasing the number of trips needed to move a given number of logs. More importantly, wear and tear on the roads is reduced because the ratio of weight per inch of tire tread on the road surface for the truck-trailer-trailer combination of the present invention is less than the ratio for many conventional vehicles used to transport logs. Braking for the truck-trailer-trailer combination of the present invention is improved because the ratio of brakes to weight carried will increase when the truck-trailer-trailer combination of the present invention is used. The present invention can take advantage of existing truck-trailer combinations and accordingly does not cause existing log trucks in good condition to become obsolete. The present invention also provides a vehicle that has satisfactory maneuverability and off-tracking characteristics for the logging industry and the other industries that require the transportation of elongate elements.

The truck-trailer-trailer combination of the present invention includes a front means, such as a truck, for carrying the first end of a first set of elongate objects. An intermediate means, such as an intermediate trailer, is attached to the front means for carrying the second end of the first set of elongate objects and the first end of a second set of elongate objects. The first set of elongate objects and the second set of elongate objects are spaced longitudinally from each other and, accordingly, a back means, such as a rear trailer, is attached to the intermediate means for carrying the second end of the second set of elongate objects.

A truck-trailer-trailer combination formed in accordance with the present invention can be provided by introducing an intermediate trailer formed in accordance with the present invention into a preexisting truck-primary trailer combination. The intermediate trailer includes a forward means for retaining a second end of a first load of logs that has its first end carried by the truck. The intermediate trailer also includes a rear means for retaining the first end of a second set of logs whose second end is then carried by the primary trailer.

DETAILED DESCRIPTION OF THE INVENTION

Figure 1:
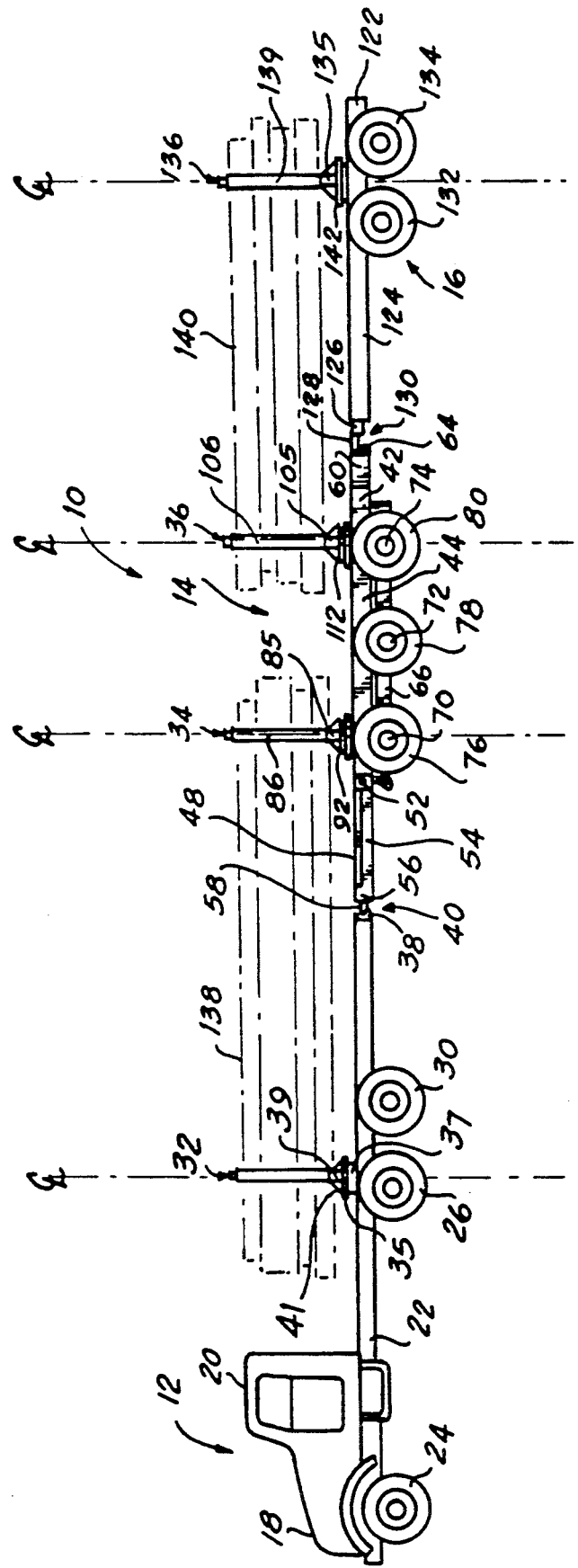
FIG. 1 is a side view of a truck-trailer-trailer combination formed in accordance with the present invention.

Referring to FIG. 1, a truck-trailer-trailer combination formed in accordance with the present invention is generally represented by reference numeral 10. Truck-trailer-trailer combination 10 includes truck 12, intermediate trailer 14, and rear trailer 16. Truck-trailer-trailer combination 10 will be described in more detail below by reference to the description of truck 12, intermediate trailer 14 and rear trailer 16.

Truck 10 can be a conventional truck or tractor used to haul heavy loads. Truck 10 includes engine compartment 18. To the rear of engine compartment 18 is driver and passenger cab 20 that includes the driver's controls. Engine compartment 18 and cab 20 are supported on an underlying chassis 22 that also carries a set of front wheels 24 on an axle (not shown). Chassis 22 to the rear of driver and passenger cab 20 carries a set of forward rear wheels 26 and a set of back rear wheels 30. Although truck-trailer-trailer combination 10 includes two sets of rear wheels, more sets of rear wheels or fewer sets of rear wheels can be used. The number of sets of rear wheels is primarily dependent upon the design of the truck 10 and its load carrying capacity. The set of front wheels 24 include a left wheel and a right wheel. The set of forward rear wheels 26 and the set of back rear wheels 30 are generally tandem sets that include four wheels per set, two on the left and two on the right.

Rearward of the axle for forward rear wheels 26 and forward of the axle for back rear wheel 30 and above chassis 22 is front bunk assembly 32. Front bunk assembly 32 is substantially identical to forward bunk assembly 34 and rear bunk assembly 36 described hereinbelow with reference to FIG. 2 and intermediate trailer 14. Front bunk assembly 32 in FIG. 1 includes bunk beam 39, fifth wheel 35, bell mount gusset 41, and bolster 37 that attaches front bunk assembly 32 to chassis 22. The end of chassis 22 opposite the set of front wheels 24 includes hook 38 that forms a portion of hitch 40 between truck 12 and intermediate trailer 14.

Figure 2:
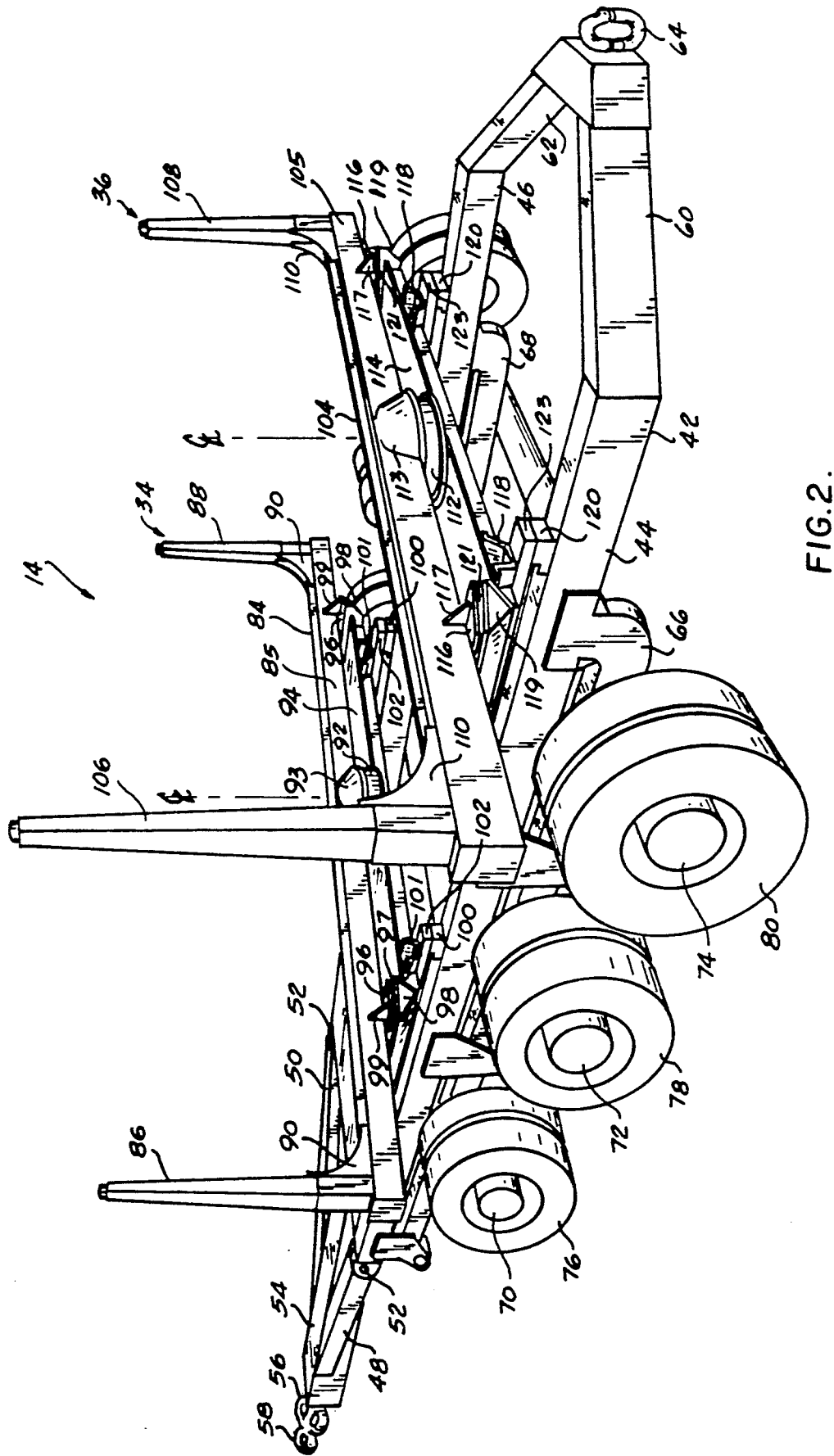
FIG. 2 is a perspective view of an intermediate trailer of the truck-trailer-trailer combination illustrated in FIG. 1.
Figure 3:
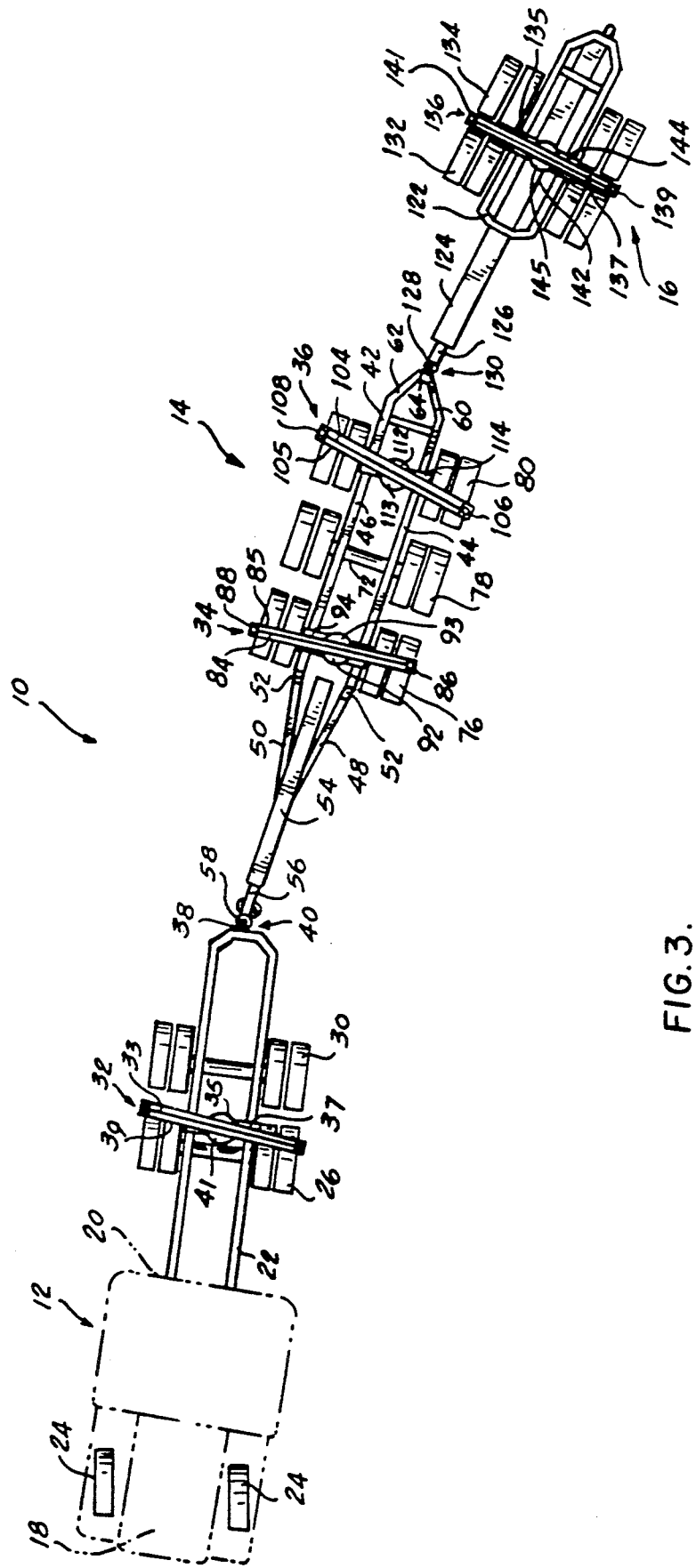
FIG. 3 is a top view of the truck-trailer-trailer combination illustrated in FIG. 1.

Referring additionally to FIGS. 2 and 3, truck-trailer-trailer combination 10 includes intermediate trailer 14. Intermediate trailer 14 includes chassis or trailer frame 42. Chassis 42 includes parallel and spaced-apart elongate left beam 44 and elongate right beam 46. The forward ends of parallel beams 44 and 46 are hingedly connected at hinges 52 to one end of left reach brace 48 and one end of a right reach brace 50. Hinges 52 pivot transverse to the longitudinal axis of truck 12 and intermediate trailer 14. This pivoting motion compensates for elevational changes between truck 12 and intermediate trailer 14. Left and right reach braces 48 and 50 extend forward from their hinged ends and angle inward toward the longitudinal centerline of intermediate trailer 14. The end of left reach brace 48 and right reach brace 50 opposite their respective hinged ends are secured to the sides of conventional reach 54. Reach 54 includes a hollow housing for receiving and fixing an elongate compensator 56 in a telescoping manner. Compensator 56 can be an elongate cylindrical element whose distal end includes an eye 58 for receiving hook 38. Hook 38 and eye 58 cooperate to attach truck 12 to intermediate trailer 14. In a conventional manner, compensator 56 is slidable within reach 54 and allows the distance between truck 12 and intermediate trailer 14 to be adjusted as the truck-trailer-trailer combination 10 rounds a corner. This feature is preferred, and enables combination 10 to have an acceptable turning radius and good tracking characteristics.

The rearward ends of parallel beam 44, and parallel beam 46 opposite reach 54 include left stinger arm 60 and right stinger arm 62 that are attached at one end to the rearward ends of parallel beam 44 and parallel beam 46. Left stinger arm 60 and right stinger arm 62 each angle inward toward longitudinal centerline of intermediate trailer 14. The end of left stinger arm 60 and right stinger arm 62 opposite their respective ends that are attached to parallel beams 44 and 46 terminate in an apex at hook 64. Hook 64 forms half of rear hitch 130 between intermediate trailer 14 and rear trailer 16.

Attached to the underside of parallel beams 44 and 46 are conventional left and right suspensions 66 and 68, respectively. Suspensions 66 and 68 serve to provide a suspension system for transverse axles 70, 72 and 74 for a set of front wheels 76, intermediate wheels 78 and rear wheels 80. Each of the sets 76, 78, and 80 of wheels includes a left set of two wheels and a right set of two wheels.

Directly above set 76 of front wheels and chassis 42 is forward bunk assembly 34. Forward bunk assembly 34 includes bunk rib 84 and bunk beam 85 positioned transverse relative to beams 44 and 46. Bunk beam 85 is an elongate beam positioned above beams 44 and 46 and extends outward to the left and right over set 76 of front wheels. Bunk rib 84 is a narrow rigid upstanding member attached to the top of bunk beam 85. Extending perpendicularly upward from the leftmost and rightmost ends of bunk beam 85 are left stake 86 and right stake 88. Left stake 86 and right stake 88 are braced to bunk beam 85 by flanges 90 positioned in the 90° corner between bunk beam 85 and left stake 86 and right stake 88. Bunk rib 84, left stake 86 and right stake 88 cooperate to retain the ends of a first set of logs 138 on intermediate trailer 14.

Bunk beam 85 is supported above chassis 42 by conventional fifth wheel 92 and bell mount gusset 93 that are supported on conventional bolster 94 between parallel beams 44 and 46 of chassis 42. Fifth wheel 92 typically consists of two parts rotating on each other, one above the other. In this instance, one-half of fifth wheel 92 is attached to the top side of bolster 94 and the other half of fifth wheel 92 is attached to the underside of bell mount gusset 93. The top side of bell mount gusset 93 receives bunk beam 85. Bolster 94 includes a rectangular plate having its long sides extending between left chassis beam 44 and right chassis beam 46. Bolster 94 is supported above and attached to left chassis beam 44 and right chassis beam 46 as described below.

Fifth wheel 92 allows forward bunk 34 to pivot above bolster 94 about the vertical centerline through fifth wheel 92. The underside of bunk beam 85 between left stake 86 and fifth wheel 92 and between right stake 88 and fifth wheel 92 is provided with rub irons 96 that help to support and maintain bunk beam 85 in a substantially horizontal position. Rub irons 96 are flat plates attached to the underside of bunk beam 85. Rub irons 96 lie parallel to the underside of bunk beam 85. Rub irons 96 are longer than the width of bunk beam 85 and accordingly extend forward and rearward from beneath bunk beam 85. Attached to the upper surface of the portions of rub irons 96 that extend beyond bunk beam 85 are vertical flanges 99. Flanges 99 are triangular-shaped plates that are attached on one side to the exposed upper surfaces of rub irons 96. Flanges 99 are seated in the 90° corner between the vertical sides of bunk beam 85 and the horizontal exposed surface of rub irons 96. Flanges 99 help to attach bunk beam 85 to rub irons 96. The surface of each rub iron 96 opposite the surface attached to bunk beam 85 bear against underlying support flanges 98 that are attached to the left and right end of bolster 94 directly beneath rub irons 96.

Support flanges 98 have a cross section in the shape of an isosceles or an equilateral triangle. The length of support flanges 98 is substantially equal to the length of rub irons 96. Each support flange 98 has one side along its length attached in a vertical plane to the left and right ends of bolster 94 respectively. Support flanges 98 are attached to bolster 94 so that another side of support flanges 98 is horizontal and positioned directly beneath and parallel to the underside of each rub iron 96. The third side of support flanges 98 is sloped and extends between the other two sides and provides reinforcement to the side in the horizontal position. Wear pad 97 is provided between the underside of rub irons 96 and the horizontal side of support flanges 98. Wear pad can be made from ultrahigh molecular weight polymers that provide lubrication and long life.

One end of bolster 94 is attached to parallel beam 44 of chassis 42 by U-shaped pressure bar 101, load cell 102 and mounting block 100. U-shaped pressure bar 101 includes upward extending arms and a horizontal base. The upward extending arms are affixed to the forward and rearward vertical sides of bolster 94 in a conventional manner, such as welding. The horizontal base of U-shaped pressure bar 101 is attached to load cell 102. Load cell 102 extends continuously beneath bolster 94 and U-shaped pressure bar 101. Two mounting blocks 100 are spaced apart along the length of parallel beam 42. Mounting blocks 100 are attached to the top of beam 42. Mounting blocks 100 are attached to and support the ends of load cell 102. Mounting blocks 100 elevate the central portion of load cell 102 above parallel beam 42. The other end of bolster 94 is attached to parallel beam 46 in a similar fashion using two U-shaped pressure bars 101, one load cell 102, and two mounting blocks 100.

To the rear of forward bunk assembly 34, directly above the rear set 80 of rear wheels and above chassis 42 is rear bunk assembly 36. Rear bunk assembly 36 includes bunk rib 104, bunk beam 105, left stake 106, right stake 108, flanges 110, fifth wheel 112, bell mount gusset 113, bolster 114, rub irons 116, vertical flanges 117, U-shaped pressure bars 118, support flanges 119, wear pads 121, load cells 123 and mounting blocks 120 identical to those described hereinabove with reference to forward bunk assembly 34. Rear bunk assembly 36 is attached to chassis 42 in substantially the same manner that forward bunk assembly 34 is attached thereto. Rear bunk assembly 36 serves to restrain the forward end of a second set of elongate elements 140 carried by the truck-trailer-trailer combination 10 of the present invention.

Referring to FIG. 3, rear trailer 16 is conventional, and can be a rear trailer of a conventional truck-primary trailer combination. Rear trailer 16 generally includes a chassis 122 that at its forward end includes reach 124 and compensator 126. Compensator 126 includes eye 128 for attachment to hook 64 on intermediate trailer 14. Reach 124 and compensator 126 are similar to reach 54 and compensator 56 described above with reference to intermediate trailer 14. Cooperation of hook 64 and eye 128 forms hitch 130 between intermediate trailer 14 and rear trailer 16. Chassis 122 includes a suspension system (not shown) for front set of wheels 132 and rear set of wheels 134. Front set 132 and rear set 134 each include four wheels, two on each side of chassis 122. Front set of wheels 132 and rear set of wheels 134 are attached to chassis 122 in a conventional manner with a conventional suspension system.

Positioned on top of chassis 122, intermediate front set of wheels 132 and rear set of wheels 134 is back bunk assembly 136. Back bunk assembly 136 includes substantially identical elements as forward bunk assembly 34 and rear bunk assembly 36 described above in relation to intermediate trailer 14. Specifically, back bunk assembly 136 includes bunk rib 137, bunk beam 135, left stake 139, right stake 141, flanges (not shown) between bunk beam 135 and stakes 139 and 141, fifth wheel 142, bell mount gusset 145, bolster 144, vertical flanges (not shown), rub irons (not shown), wear pads (not shown), support flanges (not shown), U-shaped pressure bars (not shown), and load cells (not shown), and mounting blocks (not shown). Back bunk assembly 136 serves to restrain the second end of a second set of elongate objects on rear trailer 16.

In accordance with the present invention, intermediate trailer 14 may be designed so that it can be inserted between a truck and a primary trailer of a conventional truck-primary trailer combination to provide a truck-trailer-trailer combination formed in accordance with the present invention. In this manner, existing truck-trailer combination in good condition are not rendered obsolete by the present invention.

Referring to FIG. 1, truck-trailer-trailer combination 10 formed in accordance with the present invention carries a first set of logs 138 between front bunk assembly 32 on truck 12 and forward bunk assembly 34 on intermediate trailer 14. Second set of logs 140 is carried between rear bunk assembly 36 on intermediate trailer 14 and back bunk assembly 136 on rear trailer 16. As seen in FIG. 1, depending on the length of first set of logs 138, the distance between truck 12 and intermediate trailer 14 can vary by extension of reach 54. Likewise, depending upon the length of second set of logs 140, the distance between intermediate trailer 14 and rear trailer 16 can vary by extension of reach 124. Depending upon the specific limitations of the highways over which the truck-trailer-trailer combination is to travel, the overall length of the vehicle can be altered to satisfy such requirements. The overall length to the truck-trailer-trailer combination will also be dictated by the ultimate lengths of the logs making up the first set 138 and second set 140 of logs.

Referring to FIG. 3, the turning radius of a truck-trailer-trailer combination 10 formed in accordance with the present invention is illustrated. Turning points at hitch 40 between truck 12 and intermediate trailer 14 and hitch 130 between intermediate trailer 14 and rear trailer 16 allow intermediate trailer 14 and rear trailer 16 to track relatively on course with truck 12. Compensators 56 and 126 allow the distance between truck 12 and intermediate trailer 14 and intermediate trailer 14 and rear trailer 16 respectively to vary, depending upon the sharpness of the turning radius and the fixed length of the loads.

Though not illustrated, hinge 52 on intermediate trailer 14 allows left reach brace 48, right reach brace 50 and reach 54, including compensator 56, to be rotated upward out of alignment with chassis 42. This allows intermediate trailer 14 to be carried on the back of truck 12 between the stakes of front bunk assembly 32. When carried in this manner, the three sets of wheels of intermediate trailer 14 rest atop chassis 22 of truck 12 rearward of front bunk assembly 32. At the same time intermediate trailer 14 is carried on the back of truck 12, rear trailer 16 can be carried on truck 12 beneath left reach brace 48, right reach brace 50, and reach 54, including compensator 56. In this arrangement, the two sets of wheels of rear trailer 16 rest atop chassis 22 of truck 12 forward of front bunk assembly 22. Compensator 126 and reach 124 extend forward over the top of driver and passenger compartment 20.

Although the truck-trailer-trailer combination has been described above in the specific application of logging trucks, it should be understood that a vehicle formed in accordance with the present invention can also be used to carry other elongate elements such as steel beams, trusses, and the like.

While the present invention has been described in conjunction with a preferred embodiment, one of ordinary skill after reading the foregoing specification will be able to effect various changes, substitutions of equivalents, and other alterations to the devices set forth herein. It is therefore intended that the protection granted by letters patent hereon be limited only by the definition contained in the appended claims and equivalents thereof.

The embodiments of the invention in which an exclusive property or privilege is claimed are defined as follows:

1. An apparatus for carrying a first load of elongate objects and a second load of elongate objects, the first load being spaced longitudinally from the second load, the elongate objects of the first load and the elongate objects of the second load having a first end and a second end opposite the first end, the apparatus comprising:

a motorized truck, said truck including front bunk means for retaining the first end of the first load of elongate objects on said truck;

an intermediate trailer securable to said truck, said intermediate trailer including a forward bunk means for retaining the second end of the first load of elongate objects on said intermediate trailer and a rear bunk means for retaining the first end of the second load of elongate objects on said intermediate trailer; and a rear trailer securable to the intermediate trailer, said rear trailer including back bunk means for retaining the second end of the second load of elongate objects on said rear trailer.

2. The apparatus of claim 1, wherein said front bunk means for retaining the first end of the first load of elongate objects on the truck is a bunk assembly pivoted about a vertical axis, said bunk assembly including an elongate beam having a left end and a right end, a first member extending perpendicularly from the left end, and a second member extending perpendicularly from the right end.

3. The apparatus of claim 1, wherein said forward bunk means and said rear bunk means on said intermediate trailer are bunk assemblies, said bunk assemblies being pivoted about a vertical axis, said bunk assemblies including an elongate beam having a left end and a right end, a first member extending perpendicularly from the left end, and a second member extending perpendicularly from the right end.

4. The apparatus of claim 1, wherein said back bunk means for retaining the second end of the second load of elongate objects on said rear trailer is a bunk assembly pivoted about a vertical axis, said bunk assembly including an elongate beam having a left end and a right end, a first member extending perpendicularly from the left end, and a second member extending perpendicularly from the right end.

5. The apparatus of claim 1, further comprising means for pivotal attachment of said intermediate trailer to said truck and means for pivotal attachment of said intermediate trailer to said rear trailer.

6. The apparatus of claim 5, wherein the intermediate trailer includes a reach and a compensator.

7. The apparatus of claim 5, wherein rear trailer includes a reach and a compensator.

8. An apparatus for increasing the payload capacity of a logging truck-primary-trailer combination by enabling the truck-primary-trailer combination to carry a first load of logs longitudinally displaced from a second load of logs, the logs making up the first load having a first end and a second end opposite the first end, the logs making up the second load of logs having a first end and a second end opposite the first end, the apparatus comprising:

an intermediate trailer securable to a logging truck, said intermediate trailer including a forward bunk means for retaining the second end of the first load of logs on said intermediate trailer and a rear bunk means for retaining the first end of the second load of logs on said intermediate trailer, the first end of the first load of logs being carried by said logging truck and the second end of the second load of logs being carried by a primary trailer, said intermediate trailer including means for securing said primary trailer to said intermediate trailer.

9. The apparatus of claim 8, further comprising a logging truck that includes a bunk assembly pivotal about a vertical axis for retaining the first end of the first load of logs, said bunk assembly including an elongate beam having a left end and a right end, a first member extending perpendicularly from the left end, and a second member extending perpendicularly from the right end.

10. The apparatus of claim 8, wherein said forward bunk means and said rear bunk means on said intermediate trailer are bunk assemblies, said bunk assemblies being pivotal about a vertical axis, said bunk assemblies including an elongate beam having a left end and a right end, a first member extending perpendicularly from the left end, and a second member extending perpendicularly from the right end.

11. The apparatus of claim 8, further comprising a primary trailer that includes a bunk assembly pivotal about a vertical axis for retaining the second end of the second load of logs, said bunk assembly including an elongate beam having a left end and a right end, a first member extending perpendicularly from the left end, and a second member extending perpendicularly from the right end.

12. The apparatus of claim 8, further comprising means for pivotal attachment of said intermediate trailer to the logging truck and means for pivotal attachment of said intermediate trailer to the primary trailer.

13. The apparatus of claim 12, wherein the intermediate trailer includes a reach and a compensator.

14. The apparatus of claim 12, wherein the primary trailer includes a reach and a compensator.

* * * * *